Figure 1:
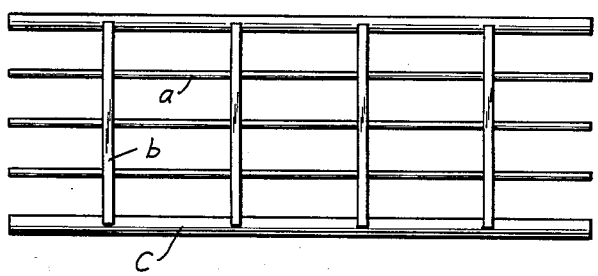

Sept. 8, 1964  G. GARETTO  3,148,077
METHOD OF COATING WITH POWDERED CELLULOSE ACETATE
Filed Feb. 17, 1961  2 Sheets-Sheet 1

INVENTOR.
Giuseppe Garetto
BY
Michael J. Striker
Atty

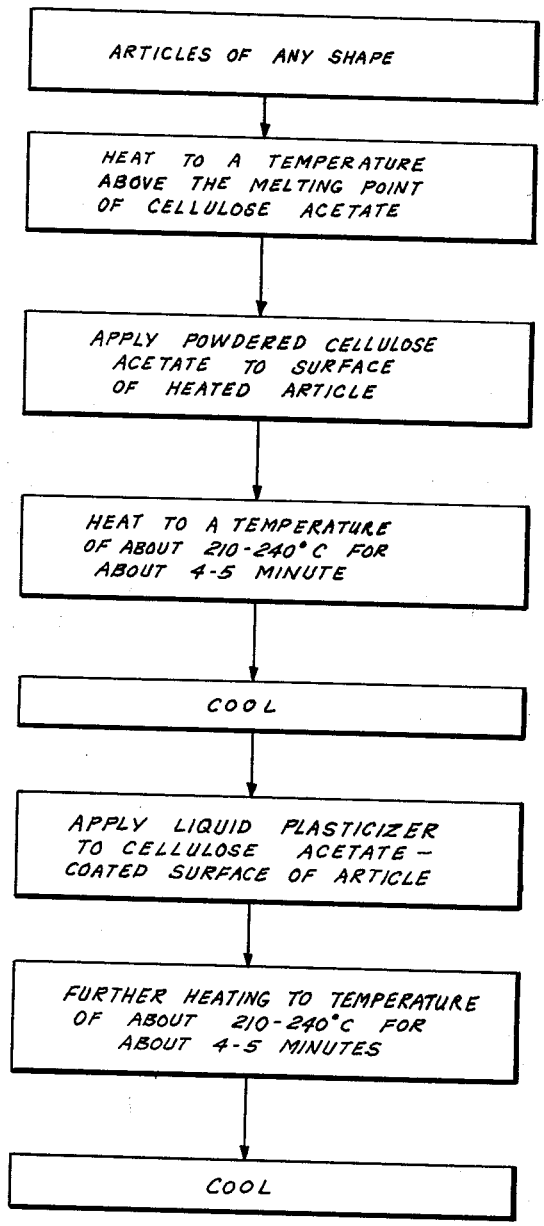

United States Patent Office 3,148,077
Patented Sept. 8, 1964

3,148,077
METHOD OF COATING WITH POWDERED CELLULOSE ACETATE
Giuseppe Garetto, Verbania Suna, Italy, assignor to Rhodiatoce S.p.A., Milan, Italy
Filed Feb. 17, 1961, Ser. No. 90,137
Claims priority, application Italy Mar. 1, 1960
7 Claims. (Cl. 117—21)

The present invention relates to a method of coating, and more particularly to the production of cellulose acetate coatings on various articles.

The production of coatings of various type on articles or supports of all different shape and kind have been accomplished in various manners, using various different thermoplastic materials for the coating. The properties of the coating and the adherence thereof to the support depends on the operating conditions used in forming the coating, on the kind of support, on the prior treatments to which the support surface has been subjected, and of course to the coating material itself.

Prior to the present invention the thermoplastic materials which have been used for coating purposes have been polyethylene, polyvinylchloride, polyamide, etc. The coatings have been formed by applying a powder of such material onto the support and heating the powder thereon so as to melt it and form the coating.

Prior to the present invention cellulose acetate coatings have not been produced by the use of powdered cellulose acetate for various reasons. The main reason has been the lack of a proper cellulose acetate powder composition. In addition, the best methods for applying a cellulose acetate coating to a surface have not been developed.

It is the object of the present invention to provide a method of coating articles with cellulose acetate.

Other objects and advantages of the present invention will be apparent from a further reading of the specification and of the appended claims.

With the above and other objects in view, the present invention mainly comprises a coating composition which consists essentially of powdered cellulose acetate particles of a size such that the same can pass through a sieve of 0.4 mm. mesh size.

The cellulose acetate should preferably have an apparent density of 400–600 grams per liter and it should have a titer in acetic acid of from about 52 to 58% as acetic acid and an average degree of polymerization of from about 150 to 250 glucose units (according to the Staudinger-Zimmerman method). The moisture content of the cellulose acetate is preferably between about 0.3% and 0.8% by weight.

The following table indicates the most preferred granulometric distribution of the size of the cellulose acetate powder, the values set forth being in percentage by weight:

TABLE 1

| Size of the mesh of the sieve in mm. | 0.400 | 0.300 | 0.200 | 0.100 |
|---|---|---|---|---|
| Percentage by weight of the powder passing through the sieve | 100 | 65–95 | 40–80 | 15–55 |

The best cellulose acetate powders for use in forming cellulose acetate coatings on various objects are formed by the addition of a plasticizer to the cellulose acetate. The plasticizer should be of the type which is adapted to soften the cellulose acetate but which is not a solvent for the cellulose acetate at normal temperature, i.e. which is a true plasticizer for the cellulose acetate and not a solvent therefor. Most preferably the plasticizer should be of the type which will not dissolve the cellulose acetate at higher temperatures at room temperature, and at temperatures even as high as 90° C.

The amount of plasticizer used is preferably between about 30 and 45% by weight, more preferably between about 35 and 45% by weight, and most preferably about 39–40% by weight.

Among the suitable plasticizers that may be used are methyl phthalate, ethyl phthalate, methylglycol phthalate, triphenylphosphate, triacetin, methylethyl phthalylglycolate, p-toluene sulfonamide, triethyl citrate, N-ethyl-p-toluene sulfonamide, allyl phthalate, amyl tartrate, butyl tartrate, and mixtures thereof.

The plasticizer may be mixed with the cellulose acetate in any suitable manner, for example by pouring the plasticizer onto the cellulose acetate, by spraying, by the addition of small quantities at a time while mixing, etc. The amount of the plasticizer should be such that the mixture of the cellulose acetate and the plasticizer does not become crumbly and does not gelatinize.

Among the most suitable mixtures of plasticizer are for example mixtures of ethyl phthalate and methylglycol phthalate or mixtures of methyl phthalate and triphenyl phosphate in which the content of triphenyl phosphate is at least 40% of the total, as well as mixtures of ethyl phthalate, methylglycol phthalate and triphenyl phosphate in which the content of triphenyl phosphate is not more than 20% of the total.

The most convenient temperature for the addition of the plasticizer to the cellulose acetate is about 5–15° C. The temperature of the mixture of the cellulose acetate and the plasticizer should not exceed 30° C., even when using plasticizers which do not dissolve the cellulose acetate at temperatures as high as 90° C.

Any auxiliary products or additives which it is desired to add to the cellulose acetate are most conveniently added during the plasticization, for example stabilizers (such as citric acid or tartaric acid), fillers (such as titanium dioxide, zinc oxide, etc.), coloring agents or coloring fillers (such as dyes, pigments, pearl essence, metallic dust, etc.), etc.

These auxiliary products may be dispersed in the plasticizer, and/or directly added during the plasticization, and/or added to the plasticized powder.

After the homogeneous dispersion of the plasticizer throughout the powdered cellulose acetate, the powder assumes the form of small grains without agglomerated particles or sintered particles sticking to each other, and without crumbling, forming films, etc.

The cellulose acetate powder with the plasticizer added thereto has the preferred distribution of particle size as set forth in Table 1 above, and the apparent density thereof may range from 550 to 750 grams per liter.

The powder obtained after the plasticization is then subjected in a thin layer to heat ageing which mainly comprises heating the powder for 6 to 24 hours at a temperature ranging from 50–90° C. This is the reason why it is preferred that the plasticizer used should not be a solvent for the cellulose acetate at temperatures even as high as 90° C. Any convenient apparatus such as a stove, of the drawer or belt type, may be used for the heat ageing of the cellulose acetate, this heat ageing preferably being carried out in a layer not higher than 3 cm.

The powder resulting from heat ageing is a dry, homogeneous powder still having the granulometric distribution as set forth in Table 1 above, and with an apparent density of from 550 to 750 grams per liter.

The powder produced in accordance with the present invention is particularly suitable for coating of articles, most preferably by a fluidification method as will be further described below, and results in the formation of coatings which are characterized by the fact that they are perfectly even, uniform in thickness and very bright.

The following examples illustrate the production of cellulose acetate powders for the formation of coatings in accordance with the present invention. The scope of the invention is not, however, meant to be limited to the specific details of the examples.

Example 1

In a 50 liter mixer of the "Ribbon-Blender" type are introduced 6 kg. of cellulose acetate having a titer in acetic acid of 55% and an average polymerization degree of 200, milled into powder so as to pass through a sieve having meshes of a diameter of 0.4 mm. and presenting the following granulometric distribution:

| Size of the mesh of sieve in mm | 0.400 | 0.300 | 0.200 | 0.100 |
|---|---|---|---|---|
| Percentage by weight of the powder passing through the sieve | 100 | 90 | 65 | 35 |

The powder has an apparent density of 430 grams per liter. Ethyl phthalate (with a purity degree of 99.5%) in which has been previously dispersed 0.300 kg. of titanium dioxide is then added while thoroughly mixing and maintaining the dispersion at a temperature of 10° C.

The powder is carefully mixed for one hour and the plasticized powder, the granulometric composition of which remained unchanged, is then distributed in a holloware in a layer about 2 cm. thick. It is heat aged in a stove for 16 hours at a temperature of 70°±5° C. and is then cooled down to about 20° C. The granulometric composition remain unchanged and the apparent density is about 580 grams per liter. The thus obtained powder can be conveniently used in the fluidification process for producing coatings on supports which have been previously heated.

The produced coatings present the advantageous properties of the plasticized cellulose acetate, i.e. hardness, brightness, no tendency at all to become dirtied by dust due to the static electricity, etc.

Example 2

In a five liter mixer of the "Werner-Pfleiderer" type are introduced 0.600 kg. of cellulose acetate having a titer in acetic acid of 52% and an average polymerization degree of 180, milled into powder so as to pass through a sieve having meshes of 0.4 mm. and presenting the following granulometric distribution:

| Size of the mesh of sieve in mm | 0.400 | 0.300 | 0.200 | 0.100 |
|---|---|---|---|---|
| Percentage by weight of the powder passing through the sieve | 100 | 75 | 50 | 20 |

The apparent density of the powder is about 450 grams per liter. Without stopping the mixer 0.400 kg. of a mixture of plasticizers consisting of 0.350 kg. of ethyl phthalate of 99.5% purity and triphenyl phosphate of 99.8% purity is added.

In the mixture of the plasticizers there has been previously dispersed 0.001 kg. of blue benzil BL and 0.001 kg. of pure citric acid, and the mixture cooled down to 10° C.

The powder is thoroughly mixed for one and one half hours and the plasticized powder, the granulometric composition of which remained unchanged, is then picked up.

The plasticized powder is distributed in a holloware in a layer about 2 cms. thick and then heat aged in a stove for 8 hours at the temperature of 80°±5° C. The powder, the granulometric composition of which remains unchanged, is cooled down to 20° C. The apparent density is now about 750 grams per liter.

The resulting powder can be conveniently used for making very thin plastic coating using the fluidification process by melting the powder over a support which has been previously heated.

As indicated above the present invention also has as its object a method of producing cellulose acetate coatings on various articles. In accordance with the present invention the cellulose acetate coatings can be formed on articles of various different materials as metals, metal alloys, wood, ceramics, glass, etc., and, in accordance with the preferred method of forming the cellulose acetate coating on the surface, in general to any material which can be heated above the temperature necessary to form the coating without melting the material.

The known methods of forming cellulose acetate coatings on various articles, for example by melting the cellulose acetate in contact with the supporting surface, have not resulted in satisfactory coatings. These coatings generally lack brilliancy and cannot withstand strains which are produced during the normal use of the coated object. In addition, it is generally necessary to subject the support to some special treatment in order to improve the adhesiveness between the support and the cellulose acetate coating. Most important, the mechanical properties of these coatings were not sufficiently good in the case of cellulose acetate and for this reason cellulose acetate coatings have not been used but coatings of other thermoplastic materials have been used instead.

In general, the use of the cellulose acetate powders of the present invention, as described above, will result in the production of satisfactory cellulose acetate coatings on various objects. However, in accordance with the preferred embodiment of the present invention the cellulose acetate powders of the present invention are applied to form coatings in accordance with the special method which will be further described below.

In accordance with the preferred method of the present invention the article to be coated is first treated to a temperature which may vary for example between 200 and 600° C., depending on the kind of article, the thickness thereof, the shape of the article, the lapse of time between the end of the heating process and the start of the coating process, etc. The heated article is then brought into contact with the cellulose acetate powder, preferably the plasticized cellulose acetate powder plasticized as described above, and maintained in contact with the cellulose acetate powder for a sufficient time (for example 4–5 minutes at 210–240° C.) to assure a complete softening of that part of the coating which is in contact with the hot surface of the support, but leaving the outermost layer of the coating unsoftened, sintered or adhered to the molten undersurface but being in solid, particulate state, and therefore porous.

This outer surface of cellulose acetate is then softened by heating, and upon cooling a uniform cellulose acetate coating is formed.

In accordance with the preferred method of proceeding of the present invention the heated article is brought into contact with the cellulose acetate powder for a sufficient time to assure complete softening of that part of the coating in contact with the hot surface of the article but leaving the outside of the same unsoftened and porous, as explained above, and then this outer surface is contacted with a plasticizer (in liquid state) of the cellulose acetate. The thus plasticizer-treated surface is then again heated (for example for 4 to 5 minutes at a temperature of 210°–240° C.), so as to soften the outermost layer, and finally cooled to form a uniform cellulose acetate coating of excellent properties.

The article to be coated may be contacted with the cellulose acetate powder by any convenient means, for example by sprinkling the powder onto the surface, or preferably by immersing the heated article into a fluidized solid bed of the cellulose acetate powder.

The contact of the surface of cellulose acetate with the plasticizer can also be achieved in any convenient manner, for example by dipping the article into the liquid plasticizer, by spraying the plasticizer over the support, etc.

Any cellulose acetate plasticizer can be used for this purpose, the plasticizers mentioned above being particularly suitable.

Figure 1A:
Figure 2:
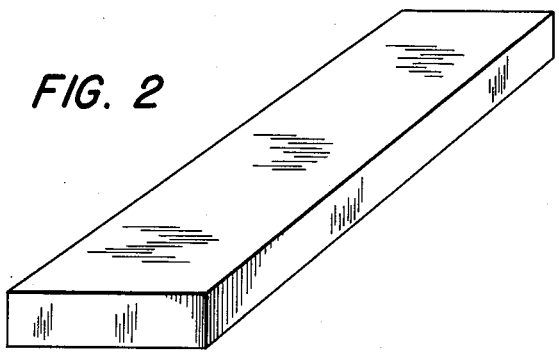
Figure 3:
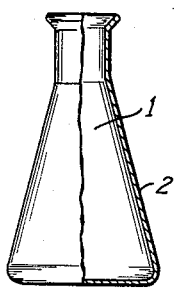

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a metallic frame to be coated;
FIG. 1a is a side view of the frame of FIG. 1;
FIG. 2 is a beech wood article to be coated;
FIG. 3 is a glass flask, partly in section, showing the coating thereon; and
FIG. 4 is a flow sheet showing the method of coating in accordance with the present invention.

The following examples, which should be read in connection with the drawing, illustrates the coating method of the present invention.

*Example 3*

A metallic frame of the type shown in FIG. 1, constructed by welding the iron wires $a$, $b$, and $c$, of the diameters respectively of 1, 2, and 3 mm. on the contact points, and having a sandblasted surface, is heated for 15 minutes in a furnace maintained at a temperature of 330° C.±25° C.

Subsequently the frame is removed from the surface and sprinkled with a powder containing 61 parts by weight of cellulose acetate and 39 parts by weight of ethyl phthalate.

When the surface of the frame is uniformly covered with the powder it is introduced in a furnace maintained at a temperature of 220° C.±5° C. and there kept for 4 minutes.

The frame is again removed from the furnace and dipped for 2–3 seconds in pure methyl phthalate at 20° C. and then permitted to drip for 5–10 seconds.

The frame is then again introduced into the furnace thermostated at 220° C.±5° C. and there kept for 4 minutes, then removed and cooled.

When the treatment is completed the frame is covered with a homogeneous layer of cellulose acetate of uniform thickness which adheres very well to the metal. The coating is bright, smooth, shock resistant and does not attract dust.

*Example 4*

A beech wood article having the shape shown in FIG. 2 is heated for 2 minutes in a furnace thermostated at 280° C.±10° C. It is then removed from the furnace and subjected to a spray of air containing in suspension a powder consisting of 58 parts by weight of cellulose acetate, 40 parts by weight of ethyl phthalate and 2 parts by weight of titanium dioxide.

After having covered the total surface with the powder, the article is introduced into a furnace thermostated at 220° C.±5° C. and there kept for 4 minutes.

It is removed from the furnace, dipped for 2–3 seconds in pure ethyl phthalate and permitted to drip for 5–10 seconds.

The article is then again introduced in a thermostated furnace at 220° C.±5° C., kept there for 4 minutes, removed and finally cooled.

When the treatment is completed the resulting article is covered by a homogeneous film based on cellulose acetate and plasticizer. The film is bright, even, of uniform thickness and shock resistant.

*Example 5*

A glass article of the shape shown in FIG. 3 is heated for 15 minutes in a thermostated furnace at 300° C.±25° C. It is then removed from the furnace and dipped in a fluidized bed of a powder containing 60 parts by weight of cellulose acetate, 40 parts by weight of ethyl phthalate and 0.2 part by weight of Blue Benzil BL in air suspension. The article covered with the power is introduced into a thermostated furnace at 220° C.±5° C. and there kept for 3 minutes. It is again removed from the furnace, dipped for 4 seconds in pure ethyl phthalate and permitted to drip for the same time.

The article is again introduced into a thermostated furnace at 220° C.±5° C. for 5 minutes, then removed and cooled. The glass article 1 is coated with a cellulose acetate layer 2.

When the treatment is completed the article is covered by a homogeneous film, blue colored, bright and having a uniform thickness which greatly increases the shock withstanding ability of the glass article.

In general coatings of a thickness from 0.02 mm. to 2 mm. can be easily produced in accordance with the method described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing a coated article, comprising the steps of applying powdered cellulose acetate to the surface of a body heated to a temperature above the softening point of said cellulose acetate so as to form a layer of cellulose acetate on said heated surface; maintaining said layer of cellulose acetate in contact with said surface and heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; removing said body from the furnace, thereby cooling the same; applying a liquid plasticizer to the outerside of said cooled solid particulate cellulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

2. A method of producing a coated article, comprising the steps of applying powdered cellulose acetate of a size such that the same can pass through a sieve of 0.4 mm. mesh size to the surface of a body heated to a temperature above the softening point of said cellulose acetate so as to form a layer of cellulose acetate on said heated surface; maintaining said layer of cellulose acetate in contact with said surface and heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the melted underside of said layer; removing said body from the furnace, thereby cooling the same; applying a liquid plasticizer to the outerside of said cooled solid particulate cellulose acetate layer; heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

3. A method of producing a coated article, comprising the steps of applying powdered cellulose acetate of a size such that the same can pass through a sieve of 0.4 mm. mesh size and having an apparent density of 400–600 grams per liter, said cellulose acetate having a titer in acetic acid of from about 52 to 58% as acetic acid to the surface of a body heated to a temperature above the softening point of said cellulose acetate so as to form a layer of cellulose acetate on said heated surface; maintaining said layer of cellulose acetate in contact with said surface while heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; removing said body from the furnace, thereby cooling the same; applying a liquid plasticizer to the outerside of said cooled solid particulate cellulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

4. A method of producing a coated article, comprising the steps of applying powdered cellulose acetate of a size such that the same can pass through a sieve of 0.4 mm. mesh size and having an apparent density of 400–600 grams per liter, said cellulose acetate having a titer in acetic acid of from about 52 to 58% as acetic acid and having an average degree of polymerization of from 150 to 250 glucose units and a moisture content of about 0.3 to 0.8% by weight to the surface of a body heated to a temperature above the softening point of said cellulose acetate so as to form a layer of cellulose acetate on said heated surface; maintaining said layer of cellulose acetate in contact with said surface while heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; removing said body from the furnace, thereby cooling the same; applying a liquid plasticizer to the outerside of said cooled solid particulate celllulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

5. A method of producing a coated article, comprising the steps of applying powdered cellulose acetate of a size such that 100% of the articles; can pass through a sieve of 0.4 mm. mesh size, 65–95% of the particles can pass through a sieve of 0.3 mm. mesh size, 40–80% of the particles can pass through a sieve of 0.2 mm. mesh size and 15–55% of the particles can pass through a sieve of 0.1 mm. size to the surface of a body heated to a temperature above the softening point of said cellulose acetate so as to form a layer of cellulose acetate on said heated surface; maintaining said layer of cellulose acetate in contact with said surface while heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; removing said body from the furnace, thereby cooling the same; applying a liquid plasticizer to the outerside of said cooled solid particulate cellulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

6. A method of producing a coated article, comprising the steps of applying powdered cellulose acetate of a size such that 100% of the articles; can pass through a sieve of 0.4 mm. mesh size, 65–95% of the particles can pass through a sieve of 0.3 mm. mesh size, 40–80% of the particles can pass through a sieve of 0.2 mm. mesh size and 15–55% of the particles can pass through a sieve of 0.2 mm. mesh size and 15–55% of the particles can pass through a sieve of 0.1 mm. mesh size and having an apparent density of 400–600 grams per liter, said cellulose acetate having a titer in acetic acid of from about 52 to 58% as acetic acid to the surface of a body heated to a temperature above the softening point of said cellulose acetate so as to form a layer of cellulose acetate on said heated surface; maintaining said layer of cellulose acetate in contact with said surface while heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; to a temperature of about 210–240° C. for about 4–5 minutes applying a liquid plasticizer to the outerside of said cooled solid particulate cellulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

7. A method of producing a coated article, comprising the steps of applying powdered cellulose acetate of a size such that 100% of the articles; can pass through a sieve of 0.4 mm. mesh size, 65–95% of the particles can pass through a sieve of 0.3 mm. mesh size, 40–80% of the particles can pass through a sieve of 0.2 mm. mesh size and 15–55% of the particles can pass through a sieve of 0.2 mm. mesh size and 15–55% of the particles can pass through a sieve of 0.1 mm. mesh size and having an apparent density of 400–600 grams per liter, said cellulose acetate having a titer in acetic acid of from about 52 to 58% as acetic acid, having a moisture content of about 0.3% to 0.8% by weight and having an average degree of polymerization of from 150 to 250 glucose units to the surface of a body heated to a temperature between about 200 and 600° C. and being above the softening point of said cellulose acetate so as to form a layer of cellulose acetate on said heated surface; maintaining said layer of cellulose acetate in contact with said surface while heating to a temperature of about 210–240° C. for about 4–5 minutes in a furnace, whereby the underside of said layer of cellulose acetate in contact with said heated surface softens and adheres to said surface while the outerside of said layer of cellulose acetate remains in solid particulate state adhering to the softened underside of said layer; removing said body from the furnace, thereby cooling the same; applying a liquid plasticizer to the outerside of said cooled solid particulate cellulose acetate layer; further heating the solid particulate outerside of said layer to which said plasticizer was applied to a temperature of about 210–240° C. for about 4–5 minutes so as to soften the layer; and cooling said body and said cellulose acetate applied thereto, thereby forming a smooth, uniform layer of cellulose acetate adhering to and coating the surface of said body.

(References on following page)

References Cited in the file of this patent

UNITED STATES PATENTS

| | | |
|---|---|---|
| 2,061,203 | Merritt | Nov. 17, 1936 |
| 2,591,077 | Lamborn | Apr. 1, 1952 |
| 2,603,575 | Schramm | July 15, 1952 |
| 2,681,473 | Carlson | June 22, 1954 |
| 2,809,120 | Sloan et al. | Oct. 8, 1957 |
| 2,843,583 | Voris | July 15, 1958 |
| 2,844,489 | Gemmer | July 22, 1958 |
| 2,974,060 | Dettling | Mar. 7, 1961 |
| 3,002,850 | Fischer | Oct. 3, 1961 |